United States Patent Office 2,716,140
Patented Aug. 23, 1955

2,716,140

FLUORINE ACTIVATED CHLORINATION

Earl T. McBee and James A. Bittles, West Lafayette, Ind., assignors to Purdue Research Foundation, Lafayette, Ind., a corporation of Indiana No Drawing. Application January 15, 1948, Serial No. 2,545

23 Claims. (Cl. 260—648)

The present invention relates to a process for chlorinating organic compounds and is more particularly concerned with a novel method of activating chlorination. The invention relates specifically to a novel chlorination process which involves the use of fluorine as chlorination activator.

A. INTRODUCTION

It has previously been proposed to chlorinate organic compounds by a wide variety of methods. Among present day procedures may be mentioned photochemical, catalytic, and thermal chlorination processes, and in each of the methods mentioned, extensive research has resulted in a high degree of perfection. Explosion, decomposition and pyrolysis have been substantially averted in many commercial chlorination practices, and extensive research has defined optimum conditions and modes of operation for many compounds.

As activator for the several methods of chlorination, there have been employed actinic light, heat, and numerous metallic catalysts, such as iron, pentavalent antimony salts, and ferric chloride. With each of the above methods of initiating or activating chlorination, it has been necessary to provide extensive equipment, such as the glass tubes which are commonly located within the reaction zone for photochemical chlorination and which are readily subject to damage and breakage. With the employment of metallic catalysts, it is necessary to provide means for reclaiming and for reactivating the catalyst, which operations often entail numerous disadvantages in handling because of the large mass of catalyst involved. Thermal activation demands equipment for heating of the reaction zone as well as means for careful temperature control. Other disadvantages are present with each of the activation methods previously employed.

It is obvious from the foregoing that it would be highly desirable to provide an effective chlorination activator which would obviate the necessity of using expensive and/or elaborate equipment, which could be introduced into the reaction zone with a minimum of effort, and which would not involve the necessity of tedious reclamation from the reaction product. Such a means of activation would advantageously be of a gaseous nature, in order to facilitate introduction into the chlorination zone and to allow entrainment in and ready recovery from the final reaction mixture of any product or byproduct which is formed.

B. OBJECTS OF THE INVENTION

It is, therefore, an object of the present invention to provide a method for the chlorination of organic compounds which involves the employment of a novel chlorination activator. Another object of the invention is the provision of a chlorination process which employs fluorine as chlorination activator. An additional object of the invention is the provision of a process for the chlorination of organic compounds in the presence of fluorine. Another object of the invention is the provision of a fluorine-activated chlorination process which is operative with equal facility in either vapor or liquid phase. Still another object of the invention is the provision of a novel chlorination activation procedure whereby the chlorination of organic compounds can be effected at a rapid rate and which allows the attainment of a high degree of chlorination in a relatively short time. A still further object of our invention is the provision of an economically and technically satisfactory method of chlorination activation which is useful in the chlorination of organic compounds generally and which obviates objectionable features of previously employed methods of chlorination activation. Other objects of the invention will become apparent hereinafter.

C. GENERAL

It has now been found that it is possible to accomplish the above and additional objects and to produce chlorinated organic compounds in high yields by the employment of a novel method of chlorination initiation, more fully described hereinafter. By the employment of fluorine, in a relatively small proportion to the chlorine used, under suitable conditions of reaction, chlorination of organic compounds may be accomplished without light, and, if desired, without added heat.

The new process may be conveniently conducted by contacting an organic compound and chlorine, in either liquid or vapor phase, in the presence of a small amount of fluorine, which may be introduced simultaneously with or subsequent to the chlorine. Any sequence of introduction is satisfactory, as long as the fluorine and organic compound are not contacted for any appreciable time in the absence of chlorine. The procedure may be varied widely with respect to reaction conditions and equipment, and may be conveniently conducted in simple apparatus at room temperature.

It is to be understood that the present invention, in its broader sense, contemplates the replacement of known chlorination activation methods by that herein described and claimed. Thus, standard procedures for the photochemical chlorination of organic compounds may be employed in conducting the process, provided only that fluorine be employed as means of activation in place of actinic light. Likewise, known thermal chlorination procedures are applicable, and when such are utilized it has been found that a much lower temperature is effective with the fluorine-activated chlorination mechanism. The processes of the prior art may be conducted according to conventional procedure, provided only that the means of chlorination activation of the prior processes be supplanted by fluorine according to the procedure described in the instant application.

The new chlorination process appears to be much more rapid than previously known processes. Yields between 95 per cent and 100 per cent are attainable in most instances over long periods of continuous operation in the vapor-phase, while similar yields are attainable in the liquid-phase.

D. THEORY OF REACTION

The exact nature of the fluorine-initiated chlorination process is not presently known. The chlorination activation mechanism of the present process is effective in either additive or substitutive chlorination and, while not limiting the invention by any theory regarding the reaction or by any theory as to the actual role of the fluorine, it may be stated that the fluorine is believed to effect a chain chlorination reaction. This, in part, would account for the rapidity of the chlorination. In conducting the process of the present invention, it is only necessary that the catalyst comprise fluorine, with or without suitable inert diluents, and the theory of reaction may be considered of secondary importance insofar as concerns the actual operation of the new process.

E. TYPE OF ORGANIC REACTANT

By the method of the new process, it is possible to chlorinate organic compounds generally, provided, of course, that the introduction of chlorine into the molecule is possible. Such compounds as saturated chlorocarbons and saturated fluorocarbons, and organic compounds in which chlorine introduction is impossible due to steric hindrance, are naturally not possible of chlorination by this novel procedure. Otherwise, any organic compounds susceptible of chlorination and including aliphatic, aromatic, alicyclic, and heterocyclic compounds may be chlorinated by the new proces. Hydrocarbons, halohydrocarbons, including chlorine- and fluorine-containing halohydrocarbons, oxygen-containing compounds such as ketones, aldehydes, ethers, alcohols, acids, esters, as well as other organic compounds, may be employed in the process to yield a chlorinated organic product containing a higher proportion of chlorine than the starting organic compound. Preferred starting materials are those organic compounds having a carbon-carbon multiple bond or a carbon-hydrogen linkage in which the hydrogen atom is theoretically capable of being replaced with fluorine, i. e., in which the replacement of the hydrogen with chlorine is not sterically hindered. Organic compounds having at least one hydrogen atom for each carbon atom, on an average, are the most desirable starting materials, and the employment of such constitutes a preferred embodiment of the invention.

Representative compounds, the chlorination of which may be accomplished according to the procedure described herein, in either liquid or vapor phase, include, for example, the following: methane, ethane, propane, isobutane, pentane, isopentane and other aliphatic hydrocarbons higher in the series, including paraffin wax; methyl chloride, ethyl bromide, propyl iodide, butyl chloride, amyl fluoride, ethylene chloride, hexachlorohexane and similar halogenated aliphatic hydrocarbons; oxygen-containing compounds such as diethyl ether, dibutyl ether, acetone, dichloroacetone, acetic acid, chloroacetic acid, fluoroacetic acid, phenetole, acetophenone, diethyl ketone, benzophenone, acetyl chloride, glutaric acid, and ethyl acetate; nitro-compounds such as nitroethane, nitropropane, and nitrobenzene; amides such as acetamide, propionamide, benzamide; nitriles such as propionitrile, glutaronitrile; amines such as ethylamine, dibutylamine, aniline, diphenylamine; alicyclic compounds such as cyclopropane, cyclopentane, methylcyclopentane, cyclohexane, cyclohexene, decalin, tetralin and substitution derivatives of the foregoing; aromatic compounds such as benzene, toluene, naphthalene, biphenyl, anthracene, acenaphthene, fluoranthene, cumene, cymene; heterocyclic compounds such as pyrrole, pyridine, piperidine, thiophene, pyrimidine, furan, dioxane; steroids; amino acids; azo compounds; sulfonic acids; polyvinyl chloride; rubber; polyvinyl alcohol; sugars; cellulose; starch; acid anhydrides; perylene, and the like.

F. RATIO OF REACTANTS

The fluorine-initiated chlorination may be successfully accomplished over the established ranges of the prior art. Thus, any conventional and desired ratio of chlorine to organic compound may be employed, provided that the ratio of reactants does not fall within the explosive range under conditions of operation. The ratio of chlorine to activating fluorine is likewise variable over a considerable range, the amount of fluorine employed in the activation being of negligible importance as long as sufficient fluorine is present to initiate the chlorination reaction and yet not cause excessive burning.

G. QUANTITY OF INITIATING FLUORINE

The ratio of activating fluorine to the chlorine utilized is, as before stated, variable over a wide range. However, as any fluorine which is not utilized in the initiation of the chlorination reaction may pass from the reactor with the reaction products, it is advisable to use only small or minute quantities, as dictated by the limits of economic operation and by the degree of chlorination desired. Thus, it may be found advantageous, when a comparatively low degree of chlorination is desired, to employ smaller quantities of fluorine than when a higher degree of chlorination is the object of the process. The degree of chlorination and yield of chlorinated product appears to vary to same extent with the amount of fluorine present or rate of fluorine introduction, and the optimum weight ratio of fluorine to chlorine appears to be below about one to twenty for complete conversion of chlorine. In other words, the weight of fluorine initiator should usually be below about five per cent of the weight of chlorine employed, and preferably between about traces and five per cent by weight of the chlorine. A weight percentage of fluorine to chlorine greater than about five per cent, and even up to ten or fifteen per cent, may be used, but the employment of such higher percentages of initiating fluorine does not appear to lend particular advantage to the process, and is ordinarily not desirable from an economic standpoint. Less fluorine appears generally necessary for liquid-phase operation of the process than for vapor-phase operation.

H. MANNER OF INTRODUCING INITIATING FLUORINE

The fluorine used in the chlorination activation may either be introduced into the liquid- or vapor-phase mixture of organic compound and chlorine periodically in small amounts or continuously at a low rate. However, since in continuous operation some of the fluorine usually passes from the reactor with the reaction product, it is preferable to supply fluorine in the latter manner. Fluorine utilized in the process may be supplied from any suitable source. The fluorine may be diluted with an inert gas, for example, helium or nitrogen, if desired, but this is not necessary for satisfactory operation. No limiting factors are involved in the introduction of fluorine into the reaction, except that the source should be conveniently situated to allow a constant supply of fluorine to be bubbled into the reaction mixture of chlorine and organic compound, that said fluorine may be supplied at a variable and controllable rate, and that said fluorine supply should be, to as great an extent as possible, free from undesirable impurities. It should be stated that, in some instances, the excess of chlorine and the small amount of initiating fluorine may be first admixed, and the mixture subsequently contacted with the organic compound. Although in most cases no unusual benefits resulted when this procedure was used, such fluorine-chlorine admixture may in some instances constitute a preferred embodiment of the invention. Procedures wherein the organic compound to be chlorinated is introduced into chlorine concurrently with initiating fluorine, wherein the organic compound is introduced into chlorine and initiating fluorine, or wherein chlorine and organic starting material are brought into the presence of fluorine are included within the scope of the present invention, but the procedure stated above is generally preferable.

I. TEMPERATURE RANGE

The temperature at which the fluorine-activated chlorination process is conducted is determined largely by the characteristics of the compound being chlorinated. The reaction may be conducted at a temperature between about −80 degrees centigrade and about 500 degrees centigrade, depending upon the phase of the reactants. When operating in the vapor-phase, we may employ any temperature between the boiling point of chlorine, −34.6 degrees centigrade, and about 500 degrees centigrade, and above the boiling point of the organic reactant. For reasons of efficiency, however, we prefer to employ temperatures low in the range, and preferably we conduct the process between zero degrees and about 200 degrees centigrade. In liquid-phase operation, the reaction is necessarily conducted only below the boiling point of the highest boiling constituent of the reaction mixture, but preferably between −34.6 degrees and 100 degrees centigrade. The reaction may be conducted, if desired, under superatmospheric pressure, and, when operating in the liquid-phase, it is easier to maintain the chlorine in the liquid state under pressure while chlorinating at a convenient temperature, such as about room temperature. By employing a lower temperature range, it is possible to prevent unnecessary decomposition of reactants and products to a desirable and surprising extent. It is considered generally desirable to conduct the procedure at a temperature between about −35 and 150 degrees centigrade, regardless of the phase employed, and preferably from about zero degrees to about 100 degrees centigrade.

J. LIQUID-PHASE OPERATION

When operating in the liquid-phase, it is desirable to maintain the mole ratio of the reactants within the usual limits prescribed by the prior art so that it is not allowed to fall within the explosive range. The temperature of the reaction in operation with one or more reactants in the liquid state is preferably maintained between about −80 and about 100 degrees centigrade, or even higher, depending on the pressure at which the chlorination is conducted and the boiling point of the highest-boiling constituent of the reaction mixture. The concentrations of chlorine and organic compound are at all times maintained at such ratios as to prevent decomposition of the organic compound being chlorinated. Pressure for the reaction may be atmospheric, subatmospheric, or superatmospheric, whichever is desired. The quantity of fluorine employed in the liquid-phase operation is unimportant so long as a sufficient amount is present to initiate the reaction but not cause burning of the organic reactant.

Any one of several procedures may be employed in conducting the liquid-phase chlorination, provided only that one reactant be maintained in a liquid state. For example, we may employ a stable chlorine-resistant solvent, dissolving the compound to be chlorinated therein, and thereafter introducing chlorine and fluorine. As a further manner of operation, we may introduce a mixture of chlorine and fluorine into the liquid compound to be chlorinated in the desired ratio. The procedure of introducing chlorine and fluorine separately and simultaneously into the compound to be chlorinated is often advantageously employed, and thus constitutes a preferred mode of operation. The fluorine, in any instance, may be admitted to the reaction diluted with nitrogen or other inert gas, in admixture with or simultaneously with chlorine in desired proportions, or in undiluted form, such as when an excess of chlorine is employed as the solvent. Other modes of operation may be employed if desired, as particularly advantageous practices of the present invention will become apparent from a study of the particular chlorination effect which is desired to be attained.

K. LIQUID-PHASE EQUIPMENT

Equipment for liquid-phase operation may comprise any vessel resistant to the action of the said reactants and reaction products. The reactor should preferably provide an inlet for the introduction of fluorine and any other reactant desired to be introduced. Outlets may be provided through which the reaction products may be periodically or continually removed. In liquid-phase operation, a fluorine inlet may be advantageously located in or near the bottom of the reactor, so that fluorine may be easily introduced into the liquid mixture of chlorine and the organic compound being chlorinated. Such arrangement is not an absolute necessity, however, inasmuch as the activating fluorine may be introduced at any point, e. g., just beneath the surface of the mixture.

We may, for example, employ a cylindrical copper reactor of fairly large diameter, having a capacity of about 1200 milliliters and provided with a Dry Ice-trichloroethylene or similar bath which allows temperatures as low as −80 degrees centigrade to be attained. Insulation, such as rock wool or other similar material, may be packed around the bath to maintain the lowered temperature in the reactor. Other suitable modes of liquid-phase operation and types of apparatus will be apparent to one skilled in the art.

L. VAPOR-PHASE OPERATION

When operating in the vapor-phase, it is only necessary to maintain the mole ratio of the organic compound to chlorine without the explosive limits as prescribed by the prior art. The temperature of the reaction in the vapor-phase is maintained above about −34.6 degrees centigrade, i. e., above the boiling point of chlorine, and below about 500 degrees centigrade, depending upon the compound being chlorinated and the pressure under which the chlorination is conducted. The temperature of the reaction in the vapor-phase is always maintained below that temperature at which excessive decomposition occurs, and is preferably, though not necessarily, below about 200 degrees centigrade. Pressure for the reaction may be atmospheric, subatmospheric, or superatmospheric, as desired, again with regard for established ranges as defined by the prior art.

Vapor-phase operation usually produces very high yields, about 95 to 100 per cent, of chlorinated product. Because the rate of chlorination is very rapid, the desired degree of chlorination is obtained almost instantaneously. The time required for the reaction naturally depends to a certain extent upon the degree of chlorination desired.

M. VAPOR-PHASE EQUIPMENT

The type of reactor for vapor-phase operation should likewise be such only that the materials of which it is constructed are resistant to the action of the said reactants and products, and that suitable inlets be provided for introduction of fluorine and any other reactant desired to be introduced. Cooled receivers may be provided as a means of condensing the organic product. One type of reactor which is adapted to the vapor-phase chlorination consists of two four-foot lengths of .75-inch nickel tubing, equipped with a jacket through which ice-water can be circulated to maintain the temperature of the reactor at about zero degrees centigrade. Gaseous chlorine and organic compound may be injected by means of a T into a second T, wherein fluorine is supplied from another arm. The reactants are thereafter continuously supplied at a constant rate controlled by calibrated flowmeters. The flow of the reactants is controlled so that the ratio of organic compound to chlorine and fluorine never attains that proportion at which substantial decomposition and pyrolysis occur. The fluorine is admitted to the reactor continuously or periodically in small amounts during the vapor-phase chlorination, and chlorinated product may be withdrawn from the reactor through coiled copper Dry Ice receivers maintained at a temperature of about −75 to −80 degrees centigrade. Other suitable manners of vapor-phase operation and apparatus will be obvious to one skilled in the art of chlorination.

N. ILLUSTRATIVE

The following examples illustrate several ways in which the principle of our invention may be applied, but are in no way to be construed as limiting the invention thereto:

*Example 1.—Cyclohexane*

One half mole (42 grams) of cyclohexane was dissolved in liquid chlorine contained in a 1.2 liter copper reactor. The reactor was fitted with a coiled inlet of ⅜ inch copper tubing extending to about ¼ inch from the bottom of the reactor, an outlet (⅜ inch tubing) welded directly to the top of the reactor, and a ⅜ inch copper thermometer well. This reactor was used for most liquid-phase chlorinations and will be referred to hereinafter.

Approximately 1731 grams of chlorine was added to the reactor, the depth of the liquid being equivalent to 5.3 inches of water pressure. An equivalent pressure of carbontetrachloride was placed on the hydrogen outlet of the cell. Fluorine from one cell, in quantity representing about 0.24 per cent of the cyclohexane by weight per minute, diluted 1:3 with nitrogen, was passed through the solution for a period of two hours. The temperature of the reaction mixture was maintained at −70 degrees centigrade throughout the reaction by means of a Dry Ice-trichloroethylene bath. One hundred and five grams of crude product was obtained after excess chlorine had been released through a water trap. The product was washed with dilute potassium hydroxide, water, dried over Drierite, and distilled under a pressure of five millimeters. Fifty-four grams of final product, boiling between 110 and 140 degrees centigrade, was obtained. Analysis: 67.4 per cent chlorine; 0.0 per cent fluorine. This corresponds to a product with an average composition of pentachlorocyclohexane, $C_6H_7Cl_5$.

Other alicyclic compounds which may be chlorinated in a manner similar to that employed for cyclohexane include cyclohexene, cyclohexadiene, chlorocyclohexane, bromocyclohexane, fluorocyclohexane, cyclopentane, cyclopentene, cyclopentadiene, methylcyclohexane, ethylcyclohexane, et cetera.

*Example 2.—n-Pentane*

One half mole (36 grams) of n-pentane was dissolved in approximately 800 milliliters of liquid chlorine contained in the copper reactor described above for the liquid-phase chlorination of cyclohexane. The reaction was maintained between −65 to −70 degrees centigrade by means of Dry-Ice cooling apparatus. Fluorine from two cells operating at 15 amperes was introduced into the reaction mixture for a period of two hours. The quantity of fluorine introduced represents about 0.56 per cent by weight of the pentane per minute. After completion of the reaction the chlorine was boiled off through two potassium hydroxide scrubbers to collect any volatile products. No material was recovered from these scrubbers, but 89 grams of chlorinated pentane was obtained from the reactor. This product was washed with potassium hydroxide and water, and dried over anhydrous calcium sulfate. The material analyzed 69.0 per cent chlorine and 0.0 per cent fluorine. This corresponds to a product with an average composition of pentachloropentane, $C_5H_7Cl_5$.

Other aliphatic hydrocarbons which may be chlorinated in the same manner as pentane include methane, ethane, propane, butane, isobutane, octane, neohexane, decane, dodecane, hexadecane, et cetera.

*Example 3.—Chlorinated pentane*

Eighty-nine grams of chlorinated pentane from Example 2 was dissolved in approximately 800 milliliters of liquid chlorine contained in a 1.2-liter copper reactor. The outlet of the reactor was fitted with a Dry Ice condenser in order to reflux the chlorine. The temperature was maintained at about −37 to −35 degrees centigrade except during the initial one-half hour period, during which time the temperature was −50 degrees centigrade. The fluorine from two cells operating at 15 amperes was passed through the mixture for a six-hour period, representing a quantity of about 0.23 per cent by weight of the chloropentane per minute. At the completion of the reaction, the chlorine was boiled off through two potassium hydroxide traps immersed in ice water, each containing 1500 grams of potassium hydroxide in four liters of water. Ninety-five grams of chlorinated material was recovered from the reactor. This was washed with potassium hydroxide, water, and dried over anhydrous calcium sulfate. A sample was found to contain 74.9 per cent chlorine, which corresponds to a product having an average composition of hexachloropentane, $C_5H_6Cl_6$ (theoretical, 76.1 per cent chlorine).

*Example 4.—n-Hexane*

One mole of n-hexane was dissolved in a liter of liquid chlorine in the copper reactor described above. The fluorine from one cell at 15 amperes was passed through the reaction mixture at −70 degrees centigrade, intermittently for the first 15 minutes. The reaction became vigorous immediately, as evidenced by the boiling of the cold bath and evolution of hydrogen chloride. After the reaction had subsided the temperature was raised to −35 degrees centigrade and a Dry Ice condenser placed on the outlet. Fluorine was bubbled through the reaction mixture for forty-five minutes at −35 degrees centigrade, making a total of one hour. The fluorine flow was thus about 0.12 per cent by weight of the n-hexane per minute. The chlorine was allowed to boil off into the hood and the product (227 grams) analyzed 72.6 per cent chlorine, corresponding approximately to the theoretical value for hexachlorohexane.

*Example 5.—Hexachlorohexane*

The two hundred and twenty-seven grams of hexachlorohexane from Example 4 was dissolved in a liter of liquid chlorine contained in the copper reactor. The outlet was fitted with a Dry Ice condenser and the reaction was maintained at −50 to −60 degrees centigrade for the first one-half hour. The temperature gradually rose to −40 to −35 degrees centigrade and was maintained at this level for the remaining five and three-quarters hours of reaction. The total time of fluorine introduction, from one cell, was six and one-quarter hours, representing a flow of about 0.05 per cent by weight of organic compound per minute. Two hundred and thirty grams of chlorinated product was recovered from the reactor after the excess chlorine had been removed. The product was washed with potassium hydroxide solution, water, and dried. The analysis was 78.1 per cent chlorine, which corresponds approximately to the theoretical value for octachlorohexane, $C_6H_6Cl_8$.

*Example 6.—Chlorooctafluoropentane*

Fifty-nine grams of chlorooctafluoropentane was placed in a copper reactor containing approximately 800 milliliters of liquid chlorine. The outlet of the reactor was fitted with a Dry Ice reflux condenser and the reaction mixture was maintained at −35 to −37 degree centigrade. The fluorine from three cells was passed into the mixture for a period of 3.5 hours, representing a fluorine flow of about 0.51 per cent by weight of organic compound per minute, after which the chlorine was allowed to boil off through two potassium hydroxide traps, each containing 1500 grams of potassium hydroxide in four liters of water. Forty-eight grams of organic product was recovered, washed with potassium hydroxide solution and water, and dried. The product analyzed 34.7 per cent chlorine and 48.6 per cent fluorine, corresponding approximately to trichlorooctafluoropentane, $C_5HCl_3F_8$. Trichlorooctafluorohexane, treated by the same procedure as above, yielded tetrachlorooctafluorohexane.

Other compounds which may be chlorinated in a manner similar to chlorooctafluoropentane include fluoroethane, fluoroethylene, chlorofluoropropane, difluorobutane, bromofluoropentane, chlorodifluorohexane, chlorodifluorooctane, trifluorooctane, et cetera.

Example 7.—Toluene

One mole (92 grams) of toluene was dissolved in approximately 800 milliliters of liquid chlorine contained in the copper reactor. The fluorine from one cell was passed through the mixture for three hours at −35 degrees centigrade. The fluorine flow was about 0.11 per cent by weight of the organic compound per minute. Excess chlorine was then allowed to boil off into the hood. Carbon tetrachloride was used to dissolve the product from the reaction, after which the solution was washed with sodium hydroxide solution, water, and dried. The solvent was then removed and the product distilled at five millimeters of mercury pressure. Two hundred seventy-three grams of chlorinated product, boiling from 150 to 160 degrees centigrade at five millimeters of mercury pressure, was recovered. The product contained 68.7 per cent chlorine, but no fluorine, and corresponded approximately to the theoretical value for dichloro-(trichloromethyl)-cyclohexadiene,

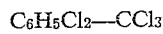

$$C_6H_5Cl_2-CCl_3$$

In another chlorination reaction with toluene, a fraction was produced containing 72.3 per cent chlorine and corresponding approximately to tetrachloro-(trichloromethyl)-cyclohexene, which contains 74.3 per cent chlorine. In still another reaction, dichloro-(trichloromethyl)-cyclohexadiene was produced in a reaction period of less than one hour, using only traces of fluorine as initiator.

Example 8.—Benzene

A ten-inch test tube equipped with a 45/50 ground glass joint was attached to a Dry Ice condenser comprising a length of 18-millimeter Pyrex tubing encased in an iron tube. The inlet tube for chlorine and fluorine introduction was a length of six-millimeter Pyrex tubing passed down through the condenser into the reaction tube. Ten grams of benzene (approximately 0.128 mole) was placed in the reaction tube, whereafter 292 grams of chlorine (approximately 8.234 gram-atoms) was condensed in the tube at Dry Ice temperature. The chlorine was allowed to reflux and about 0.06 mole of fluorine was introduced into the reaction over a period of three hours. Excess chlorine was allowed to evaporate at the end of this reaction period and 37.1 grams of benzene hexachloride, $C_6H_6Cl_6$, was recovered from the reaction tube. The yield of chlorinated product was 98 per cent.

In other experiments with benzene conducted similarly to the above, yields of chlorinated product between 85.2 and 95 per cent were obtained.

Other aromatic compounds which may be chlorinated in the same manner as toluene and benzene include xylene, ethylbenzene, naphthalene, methylnaphthalene, styrene, phenylacetylene, chlorobenzene, bromonaphthalene, benzoic acid, phenetole, benzaldehyde, piperidine, and the like.

Example 9.—Paraffin wax

Fifty grams of paraffin wax was dissolved in 200 milliliters of carbon tetrachloride and placed in the copper reactor. About 800 milliliters of liquid chlorine was then condensed in the reactor and the fluorine from one cell was passed into the liquid mixture for a period of six hours at −35 degrees centigrade. Fluorine introduction was about 0.2 per cent by weight of paraffin wax per minute. The reaction mixture was forced from the reactor with pressure and excess chlorine was allowed to evaporate. The carbon tetrachloride was then distilled, being finally removed by distillation under diminished pressure. An amorphous solid product was obtained, which analyzed 31.6 per cent chlorine.

Example 10.—Dibutyl ether

One hundred milliliters of dibutyl ether was dissolved in 800 milliliters of liquid chlorine contained in the above-described apparatus. The reactor was continuously supplied with fluorine from one cell, the flow being approximately 0.1 per cent by weight of organic compound per minute. The temperature was varied, being maintained at −70 degrees centigrade for the first two hours, at −35 degrees centigrade for the third hour, at −70 degrees centigrade for the fourth hour, and again at −35 degrees centigrade for the fifth hour. The chlorine was allowed to boil off and the product was blown free from the remaining chlorine and hydrochloric acid by a stream of nitrogen. This product was analyzed and was found to contain 72.9 per cent chlorine, which corresponds approximately to nonachlorodibutyl ether.

Example 11.—Diethyl ether

Two hundred milliliters of liquid chlorine was condensed in a twelve-inch test tube immersed in a Dry Ice bath. Twenty milliliters of diethyl ether was dissolved in the chlorine and the fluorine from one cell passed through the mixture over a period of four hours. Chlorine was then allowed to boil off and the chlorinated ether was allowed to come to room temperature, where the material polymerized. This product was washed with water and concentrated hydrochloric acid, steam-distilled and dried over anhydrous calcium sulfate. The product analyzed 30.4 per cent chlorine.

In a similar manner, ethanol, acetic acid, butyraldehyde, acetaldehyde, acetone, butanol, and other aliphatic ethers, alcohols, esters and acids may be chlorinated. For example, in a period of 10 hours, acetone was chlorinated to a content of 41.0 per cent chlorine, the reaction being conducted in a manner analogous to that given for diethyl ether, while butanol was converted to a viscous chlorine-containing product.

Example 12.—Ethane

Using the vapor-phase apparatus hereinbefore described (Paragraph M), gaseous ethane was chlorinated at 15 degrees centigrade. Chlorine was introduced at the rate of 0.146 liter per minute and ethane was passed into the reactor at the rate of 0.261 liter per minute. The rate of fluorine introduction was maintained at 0.011 liter per minute. The fluorine was diluted with nitrogen prior to introduction, but the flow represents the actual amount of fluorine. The reactor was maintained at 15 degrees centigrade by circulating tap water through the cooling jacket. The products passed through an alkali scrubber, a drying tower, and were finally collected in two Dry Ice traps placed on the outlet of the reactor and maintained at a temperature of about −80 degrees centigrade throughout the run. The reaction product consisted of a mixture of ethyl chloride plus smaller quantities of 1,1- and 1,2-dichloroethane. Chlorine conversion was 97 per cent and the yield was approximately 100 per cent.

In other similar runs, results were as follows:

| Experiment | Chlorine Conversion, Per cent | Mole Ratio, $Cl_2/F_2$ | Mole Ratio, $Ethane/Cl_2$ | Contact Time, Min. | Yield, Percent |
|---|---|---|---|---|---|
| 1 | 100.0 | 3.90 | 2.50 | 0.60 | 98.2 |
| 2 | 99.5 | 3.91 | 2.60 | 0.59 | 100.0 |
| 3 | 98.3 | 4.23 | 1.93 | 0.69 | 100.0 |
| 4 | 98.3 | 6.30 | 1.58 | 0.58 | 100.0 |
| 5 | 99.0 | 7.65 | 1.39 | 0.52 | 98.2 |
| 6 | 100.0 | 6.60 | 1.60 | 0.52 | 100.0 |
| 7 | 100.0 | 6.52 | 1.64 | 0.52 | 100.0 |
| 8 | 100.0 | 8.45 | 1.94 | 0.62 | 100.0 |
| 9 | 97.0 | 10.10 | 1.94 | 0.08 | 100.0 |
| 10 | 97.0 | 4.65 | 1.88 | 0.59 | 100.0 |

The flange of ethane to chlorine, for example may be from 1:1 to 5:1 while the amount of fluorine may be from traces to about 15 per cent by weight of the chlorine, preferably from traces to about 5 per cent by weight of the chlorine.

Example 13.—Propane

In the same apparatus as used in Example 12, propane was chlorinated in the vapor phase. Results were as follows:

| Chlorine Conversion, Percent | Mole Ratio, Cl₂/F₂ | Mole Ratio, Ethane/Cl₂ | Contact Time, Min. | Yield, Percent |
|---|---|---|---|---|
| 53 | 5.0 | 1.5 | 0.60 | 54 |

The organic product consisted of 0.45 mole of monochloropropanes and 0.04 mole of dichloropropanes.

Example 14.—Trifluoropropane

Trifluoropropane was chlorinated in the same reactor and according to the same procedure as that used in Example 12. Results were as follows:

| Chlorine Conversion, Percent | Mole Ratio, Cl₂/F₂ | Mole Ratio, CF₃CH₂CH₃/Cl₂ | Contact time, Min. | Yield, Percent |
|---|---|---|---|---|
| 43 | 6.0 | 1.35 | 0.60 | 86 |

The organic product consisted of a mixture of 2-chloro-1,1,1-trifluoropropane and 3-chloro-1,1,1-trifluoropropane. In a second run the product contained 70.9 per cent chlorine.

O. LIMITATIONS

Various modifications may be made in conventional manner in the present invention without departing from the spirit and scope thereof, and it is to be understood that our invention is to be limited only as defined in the appended claims.

We claim:

1. The process which includes: chlorinating an organic compound, by bringing into contact with the organic compound, (a) chlorine and (b) less than about fifteen per cent of fluorine, calculated on the weight of chlorine employed, to increase the chlorine content of the starting organic compound, and separating a more highly chlorinated organic product from the reaction product.

2. The process of claim 1, wherein the fluorine introduced is less than about five per cent by weight of the chlorine.

3. The process of claim 1, wherein the organic compound chlorinated is a hydrocarbon.

4. The process of claim 1, wherein the organic compound chlorinated is a halohydrocarbon.

5. The process of claim 1, wherein the organic compound chlorinated is an aliphatic compound.

6. The process of claim 1, wherein the reaction is conducted at a temperature below the boiling point of the highest boiling constituent of the reaction mixture at the pressure employed.

7. The process of claim 1, wherein the reaction is conducted with both reactants in the vapor phase at the pressure employed.

8. The process of claim 1, wherein the organic compound chlorinated is benzene.

9. The process of claim 1, wherein the organic compound chlorinated is benzene and wherein the reaction is conducted with the benzene in the liquid phase.

10. The process of claim 1, wherein the organic compound chlorinated is ethane.

11. The process of claim 1, wherein the temperature is between about −80 degrees and about 500 degrees centigrade.

12. The process of claim 1, wherein the temperature is between about −35 degrees centigrade and about 150 degrees centigrade.

13. The process which includes: continuously introducing (1) an organic compound containing a grouping selected from (a) carbon-carbon multiple bonds, and (b) carbon-hydrogen bonds in which the hydrogen is replaceable with chlorine, (2) chlorine, and (3) fluorine, into a reaction zone, the fluorine being in an amount less than about 15 per cent by weight of the chlorine introduced.

14. The process which includes: introducing (1) an organic compound containing a grouping selected from (a) carbon-carbon multiple bonds, and (b) carbon-hydrogen bonds in which the hydrogen is replaceable with chlorine, in the vapor state, (2) chlorine, and (3) fluorine, into a reaction zone, the fluorine being in an amount less than about 15 per cent by weight of the chlorine introduced.

15. The process which includes: continuously introducing (1) gaseous ethane, (2) chlorine, and (3) fluorine into a reaction zone, the amount of fluorine being less than about 15 per cent by weight of the chlorine introduced.

16. The process of claim 15, wherein the temperature of the reaction zone is maintained between about zero and about 150 degrees centigrade.

17. The process of claim 15, wherein the fluorine is in an amount less than about five per cent by weight of the chlorine.

18. The process which includes: continuously introducing gaseous ethane, chlorine, and fluorine into a reaction zone maintained at a temperature between about zero and 100 degrees centigrade, the molar ratio of ethane to chlorine being between about 1:1 and 5:1 and the amount of fluorine being less than about five per cent by weight of the chlorine introduced, and condensing a chloroethane from the reaction product.

19. A process of activating the direct chlorination of an organic compound susceptible to chlorination with chlorine which comprises introducing the chlorine together with a small proportion of fluorine into contact with the organic compound.

20. In a process for the direct chlorination of an organic compound by contacting chlorine with the organic compound, the improvement whereby the chlorination reaction is activated, which comprises introducing a small proportion of fluorine into contact with the chlorine and the organic compound.

21. A process for the production of a chlorinated organic compound by direct chlorination which comprises passing chlorine containing a small proportion of fluorine into contact with an organic compound susceptible of chlorination and subsequently recovering the chlorinated compound from the resulting products.

22. A process for the direct liquid-phase chlorination of a hydrocarbon which comprises contacting the hydrocarbon with chlorine containing a small activating proportion of fluorine and thereafter recovering the chlorinated compounds from the resulting product.

23. A process of activating the direct chlorination of an organic compound susceptible to chlorination with chlorine which comprises introducing the chlorine and a small proportion of fluorine into contact with the organic compound.

References Cited in the file of this patent

UNITED STATES PATENTS 2,407,129    Benning _____ Sept. 3, 1946

OTHER REFERENCES

Humiston, J. Phys. Chem., vol. 23, pages 572–7 (1919).
Bockemuller, Annalen der Chemie, 506, 29 to 37 (1933).
Groggins, Unit Processes in Organic Synthesis, 3rd edition, pages 168–9 (1947).